United States Patent
Kang et al.

(10) Patent No.: US 9,856,373 B2
(45) Date of Patent: Jan. 2, 2018

(54) (METH)ACRYLATE-BASED RESIN COMPOSITION HAVING EXCELLENT IMPACT RESISTANCE AND TRANSPARENCY

(71) Applicant: LG CHEM, LTD., Seoul (KR)

(72) Inventors: Byoung Il Kang, Daejeon (KR); Chang Hun Han, Daejeon (KR); Jae Bum Seo, Daejeon (KR); Da Eun Sung, Daejeon (KR); Dae Woo Lee, Daejeon (KR); Eun Jung Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 102 days.

(21) Appl. No.: 14/893,030

(22) PCT Filed: Jun. 25, 2014

(86) PCT No.: PCT/KR2014/005636
§ 371 (c)(1),
(2) Date: Nov. 20, 2015

(87) PCT Pub. No.: WO2015/008945
PCT Pub. Date: Jan. 22, 2015

(65) Prior Publication Data
US 2016/0115309 A1    Apr. 28, 2016

(30) Foreign Application Priority Data

Jul. 19, 2013 (KR) .................. 10-2013-0085461
Apr. 18, 2014 (KR) .................. 10-2014-0046976

(51) Int. Cl.
*C08L 33/12* (2006.01)
*C08L 53/02* (2006.01)
*C08F 220/14* (2006.01)

(52) U.S. Cl.
CPC ............ *C08L 53/02* (2013.01); *C08F 220/14* (2013.01); *C08L 33/12* (2013.01)

(58) Field of Classification Search
CPC .......... C08L 33/12; C08F 20/18; C08F 120/14
See application file for complete search history.

(56) References Cited

U.S. PATENT DOCUMENTS

2010/0029855 A1* 2/2010 Matsuoka ............... C08L 25/14
525/228

FOREIGN PATENT DOCUMENTS

| JP | 2006-131803 A | | 5/2006 |
| KR | 10-2010-0050220 A | | 5/2010 |
| KR | 10-2011-0035041 A | | 4/2011 |
| KR | 20110035041 | * | 4/2011 |
| KR | 10-2013-0046162 A | | 5/2013 |

OTHER PUBLICATIONS

ASTM D1238 (2004).*
ASTM D1003 (2000).*
International Search Report for PCT/KR2014/005636 filed on Jun. 25, 2014.
Written Opinion of the International Searching Authority for PCT/KR2014/005636 filed Jun. 25, 2014.

* cited by examiner

Primary Examiner — Mark S Kaucher

(57) ABSTRACT

Disclosed is a (meth)acrylate-based resin composition comprising a poly(alkyl(meth)acrylate-phenyl(meth)acrylate) copolymer comprising phenyl(meth)acrylate having excellent surface hardness and a high refractive index, as a base resin and a (conjugated diene (meth)acrylate) graft copolymer having excellent impact absorption efficiency, the (meth)acrylate-based resin composition providing excellent transparency by exhibiting excellent impact resistance even using a small amount of impact modifier. The (meth)acrylate-based resin composition having excellent impact resistance and transparency comprises 1 to 29 wt % of the (conjugated diene-(meth)acrylate) graft copolymer and 71 to 99 wt % of the poly(alkyl(meth)acrylate-phenyl(meth)acrylate) copolymer.

12 Claims, No Drawings

(METH)ACRYLATE-BASED RESIN COMPOSITION HAVING EXCELLENT IMPACT RESISTANCE AND TRANSPARENCY

CROSS-REFERENCE TO RELATED APPLICATIONS

The present application is a National Stage of International Patent Application No. PCT/KR2014/005636 filed on Jun. 25, 2014, which claims priority to Korean Patent Application No. KR 10-2013-0085461 filed on Jul. 19, 2013, and No. 10-2014-0046976 filed on, Apr. 18, 2014, the disclosures of which are hereby incorporated in their entirety by reference.

TECHNICAL FIELD

The present invention relates to a (meth)acrylate-based resin composition having excellent impact resistance and transparency. More particularly, the present invention relates to a (meth)acrylate-based resin composition comprising a poly(alkyl(meth)acrylate-phenyl(meth)acrylate) copolymer comprising phenyl(meth)acrylate having excellent surface hardness and a high refractive index, as a base resin and a conjugated diene based polymer having excellent impact absorption efficiency as an impact modifier, the (meth)acrylate-based resin composition providing excellent transparency by exhibiting excellent impact resistance even using a small amount of impact modifier.

BACKGROUND ART (Meth)acrylate-based resins have excellent transparency and weather resistance, and superior hardness, chemical resistance, surface gloss, adhesive properties, and the like, and, thus, are broadly used as a substitute for glass. At present, (meth)acrylate-based resins are used as a substitute for tempered glass used as materials of housings of home appliances such as refrigerators, air conditioners and the like, and windows applied to touch faces of mobile phones. However, since (meth)acrylate-based resins have lower impact resistance than other plastic materials, products are thickened and application thereof is limited. In addition, since (meth)acrylate-based resins have low fusibility, large area molding is difficult and a refractive index is low.

So as to improve impact resistance of such (meth)acrylate-based resins, a method of using the same after modifying with an impact modifier was suggested.

Japanese Application Pub. No. 2006-131803 discloses a (meth)acrylate-based resin modified with an impact modifier in which an acrylic rubber was used. In the method of the application, impact resistance of a (meth)acrylate-based resin was improved but was not satisfactory. In addition, when a large amount of impact modifier is used to improve impact resistance, hardness and transparency of a (meth)acrylate-based resin may be reduced. Although butadiene based impact modifiers have excellent impact resistance, they cannot be used since refractive indexes thereof are not suitable for (meth)acrylate-based resins and, thus, transparency may be reduced. Only butylacrylate-based impact modifiers may be used since they have similar refractive indexes to (meth)acrylate-based resins. However, since butylacrylate-based impact modifiers have low impact strength, large amounts of butylacrylate-based impact modifiers must be used. Accordingly, natural properties of (meth)acrylate-based resins are deteriorated.

DISCLOSURE

Technical Problem

Therefore, the present invention has been made in view of the above problems, and it is one object of the present invention to provide a (meth)acrylate-based resin composition comprising a poly(alkyl(meth)acrylate-phenyl(meth)acrylate) copolymer comprising phenyl(meth)acrylate having excellent surface hardness and a high refractive index, as a base resin and a conjugated diene based polymer having excellent impact absorption efficiency as an impact modifier, to exhibit excellent impact resistance even using a small amount of impact modifier and, thus, provide excellent transparency.

Technical Solution

In accordance with one aspect of the present invention, provided is a (meth)acrylate-based resin composition having excellent impact resistance and transparency, the (meth)acrylate-based resin composition comprises 71 to 99 wt % of a poly(alkyl(meth)acrylate-phenyl(meth)acrylate) copolymer and 1 to 29 wt % of a conjugated diene based polymer.

Advantageous Effects

As apparent from the foregoing, the present invention is suitable for preparation of a resin composition since high impact resistance may be exhibited even using a small amount of impact absorber.

According to the present invention, by using phenyl(meth)acrylate having excellent surface hardness and a high refractive index among polymers, an excellent resin composition having satisfactory hardness, impact resistance, and transparency, at the same time may be provided.

According to the present invention, a conjugated diene based impact absorber having high impact efficiency may be used, and, as such, a resin composition, which may dramatically improve transparency, may be provided.

In addition, according to the present invention, the refractive index may be freely controlled while minimizing surface hardness reduction of the base resin, by controlling the amount of the phenyl(meth)acrylate in the poly(alkyl(meth)acrylate-phenyl(meth)acrylate) copolymer as a base resin. Accordingly, an impact absorber type is not limited and a variety of impact absorbers may be used. In addition, excellent hardness and impact resistance, and the like may be provided.

BEST MODE

Hereinafter, the present invention will be described in more detail.

A (meth)acrylate-based resin composition having excellent impact resistance and transparency according to the present invention comprises 71 to 99 wt % of a poly(alkyl(meth)acrylate-phenyl(meth)acrylate) copolymer and 1 to 29 wt % of a conjugated diene based polymer.

In the application, the expression "(meth)acrylate" means acrylate and methacrylate. In addition, the expression "(meth)acrylate-based resin" means a resin prepared by mass polymerization, suspension polymerization, solution polymerization, or the like an acrylate-based monomer or a methacrylate-based monomer alone or copolymerizing the acrylate-based monomer or the methacrylate-based monomer with other comonomers through mass polymerizing, suspension polymerizing, solution polymerizing, or the like, as a polymer formed by polymerization of an acrylate-based monomer and/or an methacrylate-based monomer.

The poly(alkyl(meth)acrylate-phenyl(meth)acrylate) copolymer functions as a base resin in the present invention and may be obtained by copolymerizing an alkyl(meth) acrylate monomer and a phenyl(meth)acrylate monomer.

An alkyl group of the alkyl(meth)acrylate is preferably a C1 to C5 alkyl group. As a specific example, the alkyl(meth) acrylate may be selected from the group consisting of methylacrylate, ethylacrylate, methylmethacrylate, ethylmethacrylate, methylethacrylate, ethylethacrylate, propylacrylate, isopropylacrylate, butylacrylate, propylmethacrylate, isopropylmethacrylate, butylmethacrylate, isobutylmethacrylate, and mixtures thereof, but the present invention is not limited thereto. The alkyl(meth)acrylate is preferably selected from the group consisting of methylacrylate, methylmethacrylate, and a mixture thereof.

The phenyl(meth)acrylate is an acrylate-based monomer including an aromatic ring therein. The poly(alkyl(meth) acrylate-phenyl(meth)acrylate) copolymer used as a base resin in the present invention provides excellent surface hardness and a refractive index of the poly(alkyl(meth) acrylate-phenyl(meth)acrylate) copolymer as a base resin may be easily controlled by controlling the amount of phenyl(meth)acrylate used. Accordingly, a variety of impact modifiers having, in particular, high impact efficiency may be used and, thus, high transparency may be maintained by using a small amount of impact modifier. The phenyl(meth) acrylate may be selected from the group consisting of phenylacrylate, phenylmethacrylate, and a mixture thereof, but the present invention is not limited thereto.

A ratio of alkyl(meth)acrylate:phenyl(meth)acrylate in the poly(alkyl(meth)acrylate-phenyl(meth)acrylate) copolymer is 10 to 90:90 to 10, preferably 30 to 80:20 to 70, more preferably 35 to 79:21 to 65. Within these ranges, in particular, refractive index is preferably controlled while maintaining surface hardness. Preferably, the refractive index is similarly or identically controlled to the refractive index of the conjugated diene based polymer used as an impact modifier. When refractive index difference between the poly(alkyl(meth)acrylate-phenyl(meth)acrylate) copolymer and the conjugated diene based polymer is small, a transparent resin composition may be advantageously obtained. When a refractive index of the (conjugated diene-(meth) acrylate) graft copolymer is 1.5150 to 1.5160, preferably 1.5152 to 1.5158, more preferably 1.5154 to 1.5157, a transparent resin composition may be advantageously obtained. It may be understood that the refractive index of the (conjugated diene-(meth)acrylate) graft copolymer may be controlled by controlling ratios of the alkyl(meth)acrylate monomer and the phenyl(meth)acrylate monomer, based on polymethylmethacrylate having a refractive index of 1.4893 and polyphenylmethacrylate having a refractive index of 1.5706, as ingredients corresponding to ingredients which constitute the poly(alkyl(meth)acrylate-phenyl(meth)acrylate) copolymer. For example, when a weight ratio of the alkyl(meth)acrylate monomer to the phenyl(meth)acrylate monomer, namely, a ratio of PMMA:PPMA is 1:1, a refractive index of the poly(alkyl(meth)acrylate-phenyl(meth) acrylate) copolymer is 1.52565. On the other hand, when the weight ratio is 7.5:2.5, a refractive index of the poly(alkyl (meth)acrylate-phenyl(meth)acrylate) copolymer is 1.5154.

Weight-average molecular weight of the poly(alkyl(meth) acrylate-phenyl(meth)acrylate) copolymer is 10,000 to 1,000,000, preferably 50,000 to 150,000, more preferably 80,000 to 120,000. Within these ranges, property deterioration of injection molding may be prevented and a copolymer may be easily prepared and processed.

The conjugated diene based polymer may be a polymer comprising a conjugated diene based monomer, for example, butadiene, and is preferably selected from the group consisting of a conjugated diene based graft copolymer, a styrene-butadiene-styrene block copolymer, and a mixture thereof.

The conjugated diene based graft copolymer is preferably an ABS based graft copolymer in which a vinyl aromatic monomer and vinyl cyan monomer are graft copolymerized with a conjugated diene based rubber polymer. The conjugated diene based rubber polymer as a core may be obtained by emulsion polymerizing a conjugated diene based monomer or a mixture of a conjugated diene based monomer and vinyl aromatic monomer in the presence of an emulsifier. The conjugated diene based monomer may be selected from the group consisting of 1,3-butadiene, 2-3-butadiene, isoprene, chloroprene, or a mixture of two or more thereof, and is preferably 1,3-butadiene. The conjugated diene based rubber polymer may be prepared by preparing a small diameter rubber polymer having a relatively small average particle diameter and then preparing a rubber polymer having a relatively large diameter by fusing the small diameter rubber polymer using an acid. A diameter and gel content of the conjugated diene based rubber polymer used in preparation of the conjugated diene based graft copolymer greatly affect impact strength, processability, and the like of a resin. That is, impact strength and processability are generally decreased with decreasing rubber polymer diameter. On the other hand, impact strength increases with increasing diameter. In addition, since many monomers in a rubber polymer are swelled with decreasing gel content, an apparent diameter is increased as polymerization progresses, and, thus, impact strength is improved. However, a graft ratio is decreased when a content of the rubber polymer is high and the diameter is large. A graft ratio greatly affects properties of the conjugated diene based graft copolymer. When the graft ratio is decreased, large amounts of ungrafted rubber polymers remain and, thus, thermal stability is deteriorated. Therefore, it is important to prepare a conjugated diene based rubber polymer having a proper diameter and gel content and to have a proper graft ratio when the vinyl aromatic monomer and vinyl cyan monomer are graft copolymerized with the conjugated diene based rubber polymer. The small diameter conjugated diene based rubber polymer may be prepared through emulsion polymerization by mixing a conjugated diene based monomer, an emulsifier, a polymerization initiator, an electrolyte, a molecular weight regulator, and water. The conjugated diene based monomer is preferably at least one selected from the group consisting of butadiene, isoprene, and chloroisopreneat, more preferably butadiene. The emulsifier, polymerization initiator, electrolyte, molecular weight regulator, and the like may be easily used by those skilled in the art. For example, the emulsifier used in the emulsion polymerization is added before emulsion polymerization and when a polymerization transition ratio is 60 to 80% during a preparation process of rubber latex. The emulsifier may minimize the amounts of coagula unavoidably generated during a diameter growth process. The emulsifier used to prepare an emulsion mixture must easily form droplets and help monomers move to polymerization sites (rubber particles). In addition, the emulsifier preferably has high solubility in water such that the emulsifier is easily washed after aggregation of rubber latex and, thus, outer appearance of a final product is not affected. This function is affected by an alkyl group length, polar group types, and polarity degrees of an emulsifier, and the amount of the emulsifier also plays an important role. The emulsifier is used in an amount of 0.1 to 3.0 parts by weight, preferably 0.2 to 2.5 parts by weight, more preferably 0.3 to 2.0 parts by weight, based on 100 parts by weight of a mixture of a conjugated diene based monomer or a mixture of a conjugated diene based monomer and vinyl aromatic monomer. In particular, the emulsifier is used in an amount of 0.1 to 2.5 parts by weight, preferably 0.1 to 2.0 parts by weight, based on 100 parts by weight of the mixture of the conjugated diene based monomer or a mixture of a conjugated diene based monomer and vinyl aromatic monomer, before initiation of polymerization. A remainder of the emulsifier is preferably used when a polymerization transition ratio is 60 to 80%. When the emulsifier is used in an amount of 0.1 to 3.0 parts by weight based on 100 parts by weight of the mixture of the conjugated diene based monomer or the mixture of the conjugated diene based monomer and vinyl aromatic monomer, coagulum generation is inhibited and a particle diameter is excellently controlled. The emulsifier used in the present invention is used in preparation of rubber latex and in each graft polymerization, and the total amount of the emulsifier is 1.0 to 5.0 parts by weight, preferably 2.0 to 4.0 parts by weight. When the emulsifier is used in an amount of 1.0 to 5.0 parts by weight, a rubber phase has excellent stability and aggregation characteristics. In addition, the amount of an emulsifier remaining in an obtained resin product may be minimized and, thus, an obtained resin has excellent thermal stability and a final product exhibits excellent color. The emulsifier used in the present invention is preferably selected from the group consisting of potassium oleate, sodium dodecyl sulfate, sodium dodecylbenzenesulfate, sodium octadecyl sulfate, sodium oleic sulfate, potassium dodecyl sulfate, potassium dodecylbenzenesulfate, potassium octadecyl sulfate, potassium oleic sulfate, dioctyl sodium sulfosuccinate, sodium stearate, potassium stearate, rosin-fatty acid salt, and a mixture of two or more thereof. The rubber latex of the present invention may include an initiator and, as needed, a reductant and/or a crosslinker in a general amount during emulsion polymerization. The reductant may be selected from the group consisting of anhydrous crystalline glucose, sodium ethylenediamine tetraacetate, sodium aldehyde sulphonate, tetrasodium pyrophosphate, sodium persulfate, ferrous sulfate, sodium hydrogen sulfite, potassium hydrogen sulfite, and a mixture of two or more thereof. In addition, the crosslinker may be selected from the group consisting of 1,3-butanediol diacrylate, 1-3-butanediol dimethacrylate, 1,4-butanediol diacrylate, triarylcyanonate, triaryl isocyanonate, divinylbenzene, butylene glycol diacrylate, trimethylolpropane triacrylate, ethylene glycol dimethacrylate, and a mixture of two or more thereof. In addition, the initiator may be selected from the group consisting of cumenehydroperoxide, benzoyl peroxide, diisopropyl hydroperoxide, diisopropylbenzene hydroperoxide, t-butyl hydroperoxide, potassium persulfate, sodium persulfate, ammonium persulfate, and a mixture of two or more thereof. When the rubber latex of the present invention is prepared, an aqueous electrolyte may be further comprised. In particular, the aqueous electrolyte may be separately added before emulsion polymerization and when a polymerization transition ratio is 60 to 80%, at during preparation of the rubber latex. When the polymerization transition ratio is 60 to 80%, new particles are not generated from the rubber latex and polymerization mainly proceeds within generated particles. Accordingly, viscosity of the rubber latex increases and, thus, stability of rubber latex is reduced. The increased viscosity of the rubber latex may be decreased by adding an aqueous electrolyte and, thus, coagulum generation may be inhibited. When a polymerization transition ratio is 60 to 80%, the aqueous electrolyte is preferably added in an amount of 0.1 to 2.0 parts by weight and the amount of the aqueous electrolyte used during an overall polymerization process is preferably 0.1 to 3.0 parts by weight ("parts by weight" is based on 100 parts by weight of the conjugated diene based monomer or the mixture of the conjugated diene based monomer and vinyl aromatic monomer). When the aqueous electrolyte is used in an amount of 0.1 to 3.0 parts by weight, electrical stability of particles is not destroyed and, thus, reversible aggregation among particles does not occur. In addition, since particle diameter growth does not occur during graft polymerization, latex having a desired particle diameter may be obtained. Furthermore, particle diameter may be easily controlled and the rubber latex has excellent stability. The aqueous electrolyte is preferably at least one selected from the group consisting of sodium chloride, potassium chloride, sodium sulfate, potassium sulfate, sodium phosphate, potassium phosphate, potassium carbonate, and sodium carbonate. When the small diameter conjugated diene based rubber polymer has an average particle diameter of 600 to 1500 Å, mechanical properties such as impact strength, tensile strength, thermal stability, colorability, and the like are not deteriorated. When the small diameter conjugated diene based rubber polymer is fused (acid enlargement) using an acid ingredient, a large-diameter conjugated diene based rubber polymer may be prepared. Such an acid enlargement method may be easily performed by those skilled in the art. Through the acid enlargement method, a large-diameter conjugated diene based rubber polymer having an average particle diameter of 2500 Å to 5000 Å may be prepared. Within this range, mechanical properties such as impact strength, tensile strength, and the like, gloss, and fluidity may be preferably controlled. Subsequently, the vinyl aromatic monomer and vinyl cyan monomer are added to the prepared large diameter conjugated diene based rubber polymer, to prepare a graft copolymer. In this regard, emulsion polymerization is performed by adding an emulsifier, a molecular weight regulator, a polymerization initiator, and water, and, as such, a conjugated diene based graft copolymer may be obtained. The vinyl aromatic monomer is preferably at least one selected from the group consisting of styrene, α-methylstyrene, para-methylstyrene, o-ethylstyrene, para-ethylstyrene, and vinyltoluene, more preferably styrene. The vinyl aromatic monomer is preferably used in an amount of 30 to 60 parts by weight, based on 100 parts by weight of the large-diameter rubber polymer, to prevent yellowing and improve compatibility between resins. The vinyl cyan monomer is preferably at least one selected from the group consisting of acrylonitrile, methacrylonitrile and ethacrylonitrile, more preferably acrylonitrile. The vinyl cyan monomer is preferably used in an amount of 10 to 30 parts by weight based on 100 parts by weight of the large-diameter rubber polymer, to improve compatibility between resins and prevent yellowing. After terminating graft copolymerization, aggregation, dehydration, and drying are performed, resulting in a conjugated diene based graft copolymer powder. As a specific example, the resultant powder is composed of a butadiene core ingredient having a diameter having 350 to 450 nm and a methylmethacrylate monomer-vinyl cyan monomer (for example, acrylonitrile monomer)-vinyl aromatic monomer (for example, styrene monomer) shell ingredient. In this regard, the shell ingredient is graft copolymerized with the core ingredient and, in particular, a weight ratio of butadiene:methylmethacrylate:vinyl cyan monomer:vinyl aromatic monomer is 40:42:3:15. A refractive index of the obtained copolymer may be controlled to 1.5157.

The styrene-butadiene-styrene block copolymer is a copolymer or block copolymer of the vinyl aromatic monomer and the conjugated diene based monomer. The vinyl aromatic monomer may be understood as being similar or identical to that described above. As a more specific example, in the styrene-butadiene-styrene block copolymer, a weight ratio of styrene:butadiene:styrene may be 26:48:26 (LG614 available from LG chemistry in Republic of Korea), 11:78:11 (LG604 available from LG chemistry in Republic of Korea), or the like, but such ratios are merely examples and the present invention is not limited thereto.

A refractive index of the conjugated diene based polymer, as an impact modifier, added to improve impact resistance strength of the base resin and prevent deterioration of transparency is preferably similar or identical to a refractive index of the poly(alkyl(meth)acrylate-phenyl(meth)acrylate) copolymer. When difference between the refractive indexes is large, transparency of an obtained resin composition is deteriorated.

The (meth)acrylate-based resin composition according to the present invention may be prepared by mixing 1 to 29 wt %, preferably 5 to 25 wt %, more preferably 6 to 22 wt %, of the conjugated diene based polymer, and 71 to 99 wt %, preferably 75 to 95 wt %, more preferably 78 to 94 wt %, of the poly(alkyl(meth)acrylate-phenyl(meth)acrylate) copolymer, which are obtained as described above. In this regard, within the ranges, excellent impact resistance and transparency may be provided.

In addition, when the (meth)acrylate-based resin composition according to the present invention has preferably a fluidity of 15 to 25, the resin composition has satisfactory formability.

Furthermore, when the (meth)acrylate-based resin composition according to the present invention has preferably a haze value of 2.0 or less, the resin composition has high transparency.

Now, the present invention will be described in more detail with reference to the following examples. These examples are provided only for illustration of the present invention and should not be construed as limiting the scope and spirit of the present invention.

EXAMPLE

Examples 1 to 7 and Comparative Examples 1 to 5

As base resins, poly(methylmethacrylate-phenylmethacrylate) copolymers according to compositions summarized in Table 1 (examples) and Table 2 (comparative examples) below were prepared. Properties (pencil hardness, molecular weights (weight-average molecular weight), and glass transition temperature) of the prepared poly(methylmethacrylate-phenylmethacrylate) copolymers were measured. Subsequently, an impact modifier was mixed according to compositions summarized in Tables 1 and 2 below and resin composition samples were prepared through injection molding. Properties (pencil hardness, fluidity, impact strength, and transparency (haze value)) of the prepared samples were measured. Results are summarized in Tables 1 and 2.

Impact Modifier 1 of Tables 1 and 2 below is an ABS based graft copolymer as a core-shell type (butadiene rubber exists as a core) butadiene based polymer obtained thorough emulsion polymerization according to the present invention. Impact Modifier 2 is a graft copolymer, in which butylacrylate rubber as a core and methylmethacrylate as a shell are graft copolymerized, as an impact modifier through emulsion polymerization. Impact Modifier 2 has a refractive index of 1.4890. Impact Modifier 3 is a styrene-butadiene-styrene copolymer (LG614 available from LG chemistry in Republic of Korea) and Impact modifier 4 is a styrene-butadiene-styrene block copolymer (LG604 available from LG chemistry in Republic of Korea).

Comparative Example 6

Comparative Example 6 was performed in the same manner as in Example 1, except that a poly(methylmethacrylate-benzylmethacrylate) copolymer was prepared using benzylmethacrylate, instead of phenylmethacrylate, as a base resin.

[Property Evaluation]

Izod impact strength was measured using a ⅛ inch sample according to ASTM D256.

Transparency (light transmittance; haze value) was measured using an injection-molded sample having a thickness of 3 mm according to ASTM D1003.

Pencil hardness was measured according to ASTM D3363.

To confirm fluidity, melt flow indexes were measured according to ASTM D1238.

Molecular weights were measured using gel permeation chromatography (available from Waters).

Glass transition temperature (Tg) was measured using a differential scanning calorimeter (DSC) available from TA Instruments.

TABLE 1

| Classification | | 1 | 2 | 3 | 4 | 5 | 6 | 7 |
|---|---|---|---|---|---|---|---|---|
| Copolymer compositions (parts by weight) | MMA | 75 | 78 | 58 | 75 | 40 | 58 | 40 |
| | PhMA | 25 | 22 | 42 | 25 | 60 | 42 | 60 |
| Copolymer properties | Refractive index | 1.5154 | 1.5150 | 1.5201 | 1.5154 | 1.5321 | 1.5201 | 1.5321 |
| | Pencil hardness | 2H | 2H | 2H | 2H | 2H | 2H | 2H |
| | Molecular weight | 90000 | 90000 | 90000 | 90000 | 92000 | 90000 | 92000 |
| | Tg | 121 | 119 | 122 | 121 | 123 | 122 | 123 |
| Composition of resin composition (parts by weight) | Base resin | 90 | 90 | 90 | 93 | 90 | 95 | 95 |
| | Impact modifier 1 | 10 | 10 | — | 7 | — | — | — |
| | Impact modifier 2 | — | — | — | — | — | — | — |

TABLE 1-continued

|  |  | Examples | | | | | | |
|---|---|---|---|---|---|---|---|---|
| Classification | | 1 | 2 | 3 | 4 | 5 | 6 | 7 |
| Properties of resin composition | Impact modifier 3 | — | — | 10 | — | — | 5 | — |
| | Impact modifier 4 | — | — | — | — | 10 | — | 5 |
| | Pencil hardness | 2H | 2H | 2H | 2H | 2H | 2H | 2H |
| | Fluidity | 20 | 20 | 22 | 24 | 21 | 24 | 21 |
| | Impact strength | 4.6 | 4.5 | 7.7 | 3.4 | 5.3 | 4.8 | 3.2 |
| | Haze value | 1.4 | 1.6 | 1.9 | 1.6 | 1.9 | 1.2 | 1.4 |

MMA = methylmethacrylate,
PhMA = phenylmethacrylate,
Tg = glass transition temperature,

TABLE 2

|  |  | Comparative Examples | | | | | |
|---|---|---|---|---|---|---|---|
| Classification | | 1 | 2 | 3 | 4 | 5 | 6 |
| Copolymer composition (parts by weight) | MMA | 75 | 75 | 100 | 58 | 40 | 75 |
| | PhMA | 25 | 25 | — | 42 | 60 | 25* |
| Copolymer properties | Pencil hardness | 2H | 2H | 2H | 2H | 2H | 2H |
| | Molecular weight | 90000 | 90000 | 90000 | 90000 | 92000 | 90000 |
| | Tg | 121 | 119 | 122 | 122 | 123 | 121 |
| Composition of resin composition (parts by weight) | Base resin | 90 | 70 | 90 | 70 | 70 | 99.5 |
| | Impact modifier 1 | — | 30 | — | — | — | 0.5 |
| | Impact modifier 2 | 10 | — | 10 | — | — | — |
| | Impact modifier 3 | — | — | — | 30 | — | — |
| | Impact modifier 4 | — | — | — | — | 30 | — |
| Resin composition properties | Pencil hardness | 2H | F | 2H | F | F | 2H |
| | Fluidity | 22 | 12 | 14 | 14 | 12 | 11 |
| | Impact strength | 2.8 | 14.3 | 2.6 | 11.3 | 9.3 | 1.7 |
| | Haze value | Opaque | 3.6 | 1.4 | 3.3 | 3.6 | 0.8 |

MMA = methylmethacrylate,
PhMA = phenylmethacrylate,
Tg = glass transition temperature,
*= benzylmethacrylate As shown in Tables 1 and 2, it can be confirmed that the resin compositions according to the present invention (Examples 1 to 7) have low haze values (high transparency) with uniform pencil hardness, fluidity, and impact strength, when compared with comparative examples, in which opaqueness or a high haze value is exhibited when pencil strength is high, or impact strength is decreased when a haze value is lowered, according to conventional technology.

Meanwhile, it can be confirmed that a refractive index is disadvantageously low when the poly(alkyl(meth)acrylate-benzyl(meth)acrylate) copolymer comprising benzylmethacrylate instead of phenyl(meth)acrylate is used as the base resin.

What is claimed is:

1. A (meth)acrylate-based resin composition, comprising:
   90 to 95 wt % of a poly(alkyl(meth)acrylate-phenyl(meth)acrylate) copolymer; and
   5 to 10 wt % of a conjugated diene based polymer.

2. The (meth)acrylate-based resin composition according to claim 1, wherein the conjugated diene based polymer is selected from the group consisting of conjugated diene based graft copolymer, styrene-butadiene-styrene block copolymer, and a mixture thereof.

3. The (meth)acrylate-based resin composition according to claim 1, wherein an alkyl group of alkyl(meth)acrylate of the poly(alkyl(meth)acrylate-phenyl(meth)acrylate) copolymer is a C1 to C5 alkyl group.

4. The (meth)acrylate-based resin composition according to claim 1, wherein alkyl(meth)acrylate of the poly(alkyl(meth)acrylate-phenyl(meth)acrylate) copolymer is selected from the group consisting of methylacrylate, ethylacrylate, methylmethacrylate, ethylmethacrylate, methylethacrylate, ethylethacrylate, propylacrylate, isopropylacrylate, butylacrylate, propylmethacrylate, isopropylmethacrylate, butylmethacrylate, isobutylmethacrylate, and a mixture of two or more thereof.

5. The (meth)acrylate-based resin composition according to claim 1, wherein a weight ratio of alkyl(meth)acrylate:phenyl(meth)acrylate in the poly(alkyl(meth)acrylate-phenyl(meth)acrylate) copolymer is 10 to 90:90 to 10.

6. The (meth)acrylate-based resin composition according to claim 2, wherein the conjugated diene based polymer has a refractive index of 1.5150 to 1.5160.

7. The (meth)acrylate-based resin composition according to claim 2, wherein the conjugated diene based graft copolymer is an ABS based graft copolymer comprising rubber latex as a core.

8. The (meth)acrylate-based resin composition according to claim 7, wherein the conjugated diene based rubber latex as a core is obtained by emulsion polymerizing a conjugated diene based monomer, or a mixture of a conjugated diene based monomer and vinyl aromatic monomer, in the presence of an emulsifier.

9. The (meth)acrylate-based resin composition according to claim 8, wherein the conjugated diene based monomer is selected from the group consisting of 1,3-butadiene, isoprene, chloroprene, or a mixture of two or more thereof.

10. The (meth)acrylate-based resin composition according to claim 8, wherein the vinyl aromatic monomer is selected from the group consisting of styrene, α-methylstyrene, vinyl toluene, α-chlorostyrene, o-methyl styrene, dichlorostyrene, vinylnaphthalene, and a mixture of two or more thereof.

11. The (meth)acrylate-based resin composition according to claim 8, wherein, in the mixture of the conjugated diene based monomer and vinyl aromatic monomer, a mix ratio of the conjugated diene based monomer:vinyl aromatic monomer is 70 to 95:5 to 30 in parts by weight.

12. The (meth)acrylate-based resin composition according to claim 1, wherein the conjugated diene based polymer includes a styrene-butadiene-styrene copolymer.

* * * * *